United States Patent [19]

Tanigaki et al.

[11] Patent Number: 4,553,139

[45] Date of Patent: Nov. 12, 1985

[54] VACUUM MONITOR FOR VACUUM INTERRUPTER

[75] Inventors: Shuzo Tanigaki, Tokyo; Masayuki Sakaki, Numazu, both of Japan

[73] Assignee: Kabushiki Kaisha Meidensha, Japan

[21] Appl. No.: 506,662

[22] Filed: Jun. 22, 1983

[30] Foreign Application Priority Data

Jul. 5, 1982 [JP] Japan ............................. 57-116505
Aug. 17, 1982 [JP] Japan ............................. 57-142388

[51] Int. Cl.⁴ .......................................... G08B 21/00
[52] U.S. Cl. .................................. 340/626; 340/644; 340/605
[58] Field of Search ............... 340/626, 644, 638, 639, 340/605, 660; 200/144 B; 361/2, 120

[56] References Cited

U.S. PATENT DOCUMENTS

| | | | |
|---|---|---|---|
| 3,403,297 | 9/1968 | Crouch | 361/115 |
| 3,594,754 | 7/1971 | Voshall | 340/605 |
| 4,021,702 | 5/1977 | Rimmrott | 361/103 |
| 4,103,291 | 7/1978 | Howe et al. | 340/522 |
| 4,402,224 | 9/1983 | Fukushima | 340/626 X |

Primary Examiner—James L. Rowland
Assistant Examiner—Jeffery A. Hofsass
Attorney, Agent, or Firm—Lowe, King, Price & Becker

[57] ABSTRACT

A vacuum monitor for a vacuum interrupter which can detect poor vacuum pressure at high detection sensitivity from the outside of the interrupter, on the basis of the impulsive electromagnetic wave signals generated when vacuum pressure increases within the vacuum interrupter. The vacuum monitor according to the present invention comprises, in particular, a detector terminal of capacitor coupler type or inductor coupler type disposed near a high voltage conductor for receiving impulsive electromagnetic wave signals, a signal level discriminating section, and a diagnosis section for improving the reliability of the monitor, particularly when the detected signal level of the electromagnetic wave signals is low.

17 Claims, 16 Drawing Figures

OPENED CONTACTS

FIG. 2(B)

CLOSED CONTACTS

VACUUM MONITOR FOR VACUUM INTERRUPTER

BACKGROUND OF THE INVENTION

1. Field of the Invention

The present invention relates generally to a vacuum monitor for detecting poor vacuum pressure within a vacuum interrupter, and more specifically to a vacuum monitor which can produce an alarm or indicate a caution when vacuum pressure within a vacuum interrupter is abnormally increasing.

2. Description of the Prior Art

Generally, a vacuum interrupter for use with an electric power circuit has a normal circuit interruption performance when pressure of vacuum within its evacuated envelope is kept below $10^{-4}$ Torr (Torricelli). However, the pressure of vacuum sometimes increases and the circuit interruption performance deteriorates, because of, for instance, outgassing from materials used for the interrupter or slow leakage of air (air is leaked through cracks caused by undue mechanical stresses or through welded or insufficiently brazed junction portions). In case vacuum pressure increases abnormally within the evacuated envelope, the small contact spacing will no longer by able to sustain a high voltage applied to the contacts; arcs and flashovers will occur; white hot arc will burn the contact surfaces and may melt the vacuum envelope and other parts of the vacuum interrupter.

Therefore, in an electric power circuit, it is very important to check or monitor vacuum pressure within the vacuum interrupter while a vacuum interrupter is in operation; namely, even while the contacts are kept closed or opened. In recent years, accordingly, various kinds of vacuum pressure measuring devices for vacuum interrupters have been put into practical use. These vacuum pressure measuring devices, however, have the following disadvantages in practical use: (1) There exists a vacuum pressure measuring device such that a pair of electric discharge electrodes are additionally provided within the evacuated envelope and a high voltage is independently applied to the electric discharge electrodes from a separate high-voltage power supply, in order to check the change in electric discharge phenomenon caused in accordance with Paschen's law (because vacuum pressure exerts an influence upon the phenomenon of electric discharge). In such a device, the structure of the vacuum interrupter is complicated and the manufacturing cost is relatively high, because an additional high-voltage power supply is necessary. (2) There exists another vacuum pressure measuring method such that a vacuum interrupter is once disconnected from a power circuit and the movable and fixed contacts are readjusted to such an appropriate spacing that electric discharge is readily generated in accordance with Paschen's law, before applying a high voltage thereto from a separate high voltage power supply, in order to check the state of electric discharge. In such a method, the power circuit or the power supply must be disconnected from the vacuum interrupter; that is, it is impossible to check the vacuum pressure while applying a high voltage to the interrupter (i.e. under hot-line condition) and therefore it takes much time and troublesome labor. (3) Further, recently miniature substation installations have been developed within which a vacuum interrupter is housed. In such an installation, it is necessary to drain insulation medium such as oil or gas out of the installation housing before checking the vacuum pressure within the vacuum interrupter, provided that the method described above (2) is employed. In such an installation, accordingly, more time and more troublesome labor are required, and additionally, there exists another possibility of the occurrence of accidents caused by erroneous reassembly or readjustment due to human mistake.

To overcome the above-mentioned shortcomings there has been proposed a vacuum monitor for a vacuum interrupter which can easily check poor vacuum pressure within a vacuum interrupter, without need of any additional electric discharge electrodes or high voltage power supply, provided that a high supply voltage is being applied to a power circuit via a vacuum interrupter, at relatively low manufacturing cost and through simple checking procedure. This vacuum monitor for a vacuum interrupter comprises an antenna disposed near a conductive material of the vacuum interrupter for receiving impulsive electromagnetic wave signals generated by electric discharge caused in accordance with a prebreakdown voltage depending upon Paschen's law when vacuum pressure increases within the vacuum interrupter and a detector circuit connected to the antenna for electrically processing the impulsive electromagnetic wave signals received by the antenna in order to indicate poor vacuum pressure within a vacuum interrupter. The vacuum monitor as described above is disclosed in detail in our former Patent Application Document (U.S. patent application Ser. No. 437,678 filed on Oct. 29, 1982, EPC Patent Application No. 82 305 761.7 filed on Oct. 29, 1982, or Korean Patent Application No. 82-4846 filed on Oct. 28, 1982).

However, since this vacuum monitor can check poor vacuum pressure within the vacuum interrupter in dependence upon impulsive electromagnetic wave signals emitted to the air from the vacuum interrupter or a conductive material connected to the interrupter, in the case where the vacuum interrupter is perfectly covered by an insulating solid material and the insulating solid material is additionally covered by a metal layer connected to the ground, no impulsive electromagnetic wave signals are emitted to the outside. In the same way, in the case where the vacuum interrupter is housed within a metal housing filled with an insulating medium such as an oil or gas and the metal housing is perfectly grounded and further where other conductive materials connected to the vacuum interrupter are all shielded perfectly, no impulsive electromagnetic wave signals are emitted to the outside. In other words, there exist shortcomings such that it is impossible to check poor vacuum pressure within a vacuum interrupter which is housed within a casing perfectly shielded and grounded.

Furthermore, in the case where an antenna is used for detecting the impulsive electromagnetic wave signals, even if the vacuum interrupter is not housed within a casing; that is, the vacuum interrupter is bare, since the voltage level of the impulsive electromagnetic wave signals detected through the antenna is relatively low, a higher-gain amplifier circuit is inevitably needed at the succeeding stage, thus resulting in a higher-cost in the vacuum monitor for a vacuum interrupter.

SUMMARY OF THE INVENTION

With these problems in mind, therefore, it is the primary object of the present invention to provide a vacuum monitor for a vacuum interrupter which can check poor vacuum pressure within a vacuum interrupter at higher detection sensitivity, in dependence upon impulsive electromagnetic wave signals generated by electric discharge when vacuum pressure increases within the vacuum interrupter, in order to enable the use of a relatively lower-gain amplifier circuit or to reduce the cost of the vacuum monitor.

To achieve the above-mentioned object, the vacuum monitor for a vacuum interrupter according to the present invention comprises a peculiar detector terminal non-galvanically, namely, inductively or capacitively coupled to a conductive material to which a high voltage is applied. The detector terminal is attached in position in any desired elements (not necessarily grounded or shielded) of the vacuum interrupter to be monitored. The detector terminals are of a capacitor coupler type (C-type), a current transformer type (CT-type) or a potential transformer type (PT-type).

It is another object of the present invention to provide a vacuum monitor for a vacuum interrupter which can check poor vacuum pressure within a vacuum interrupter, in dependence upon impulsive electromagnetic wave signals generated by electric discharge when vacuum pressure increases within the vacuum interrupter, even if the vacuum interrupter and the associated conductive materials connected to the interrupter are all shielded and grounded perfectly.

To achieve the above-mentioned object, the vacuum monitor for a vacuum interrupter according to the present invention comprises a peculiar detector terminal non-galvanically, namely, inductively or capacitively coupled to a conductive material to which a high voltage is applied. The detector terminal is attached in position in the wall of the grounded casing for the vacuum interrupter. The detector terminals are of a capacitor coupler type (C-type), a current transformer type (CT-type) or a potential transformer type (PT-type), similarly.

Further, the vacuum monitor according to the present invention comprises, in particular, means for discriminating the magnitude of the signal level of impulsive electromagnetic wave signals indicative of a poor vacuum pressure in order to apply the electromagnetic wave signals to the next stage through a voltage divider when the signal level exceeds a predetermined reference value. Therefore, it is possible to reliably detect the electromagnetic wave signals indicative of a poor vacuum pressure without being subject to the influence of external electrical noise signals.

Additionally, the vacuum monitor according to the present invention comprises means for outputting a diagnosis signal the frequency of which lies from 2 to 400 kHz exactly or from 2 to 20 kHz substantially in order to diagnose the functions of the vacuum monitor itself. Therefore, it is possible to more reliably detect the electromagnetic wave signals indicative of a poor vacuum.

BRIEF DESCRIPTION OF THE DRAWINGS

The features and a advantages of the vacuum monitor for an vacuum interrupter according to the present invention over the prior-art vacuum measuring devices or method will be more clearly appreciated from the following description of the preferred embodiments of the invention taken in conjunction with the accompanying drawings in which like reference numeals designate the same or similar elements or sections throughout the figures thereof and in which.

DETAILED DESCRIPTION OF THE PREFERRED EMBODIMENTS

In view of the above description, reference is now made to the vacuum monitor for a vacuum interrupter according to the present invention. First, the structure of a vacuum interrupter will be described hereinbelow.

Figure 1:
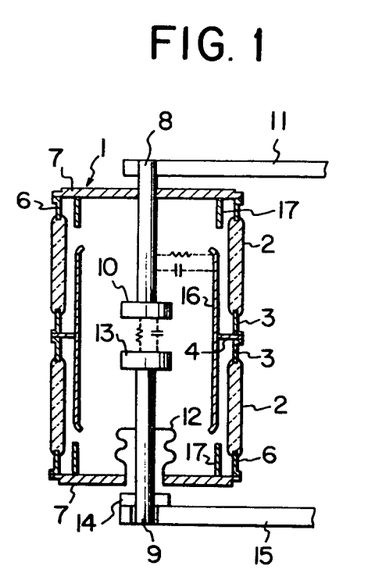
FIG. 1 is a longitudinal cross-sectional view of a vacuum interrupter, in which the fixed and movable contacts are kept opened.

In FIG. 1, the reference numeral 1 denotes a typical vacuum interrupter, the evacuated envelope of which comprises two tubular insulating housings 2 made of glass or ceramics and hermetically joined to each other by two metallic tubes 3 with a disk 4 sandwiched therebetween, and a pair of metallic end caps 7 also hermetically joined to the tubular insulating housing 2, respectively, with a metallic tube 6 joined hermetically on either opposite side (upper and lower sides) of the insulating housing 2. At the center of the respective end caps 7, there are disposed two conductive contact rods 8 and 9. The fixed conductive contact rod 8 is hermetically joined at its upper end to the upper metallic end cap 7. A fixed contact 10 is fixedly brazed to the lower end of the fixed conductive contact rod 8 and an external connection conductor 11 is joined to the upper end of the fixed conductive contact rod 8. The movable conductive contact rod 9 is movably joined to the lower end cap 7 through a metal bellows 12 so as to be freely movable in the axial direction of the envelope without destroying a vacuum within the envelope. A movable contact 13 is fixedly brazed to the upper end of the movable conductive contact rod 9, and a slide contact 14 is slidably fitted to the lower end of the movable contact rod 9. Further, the numeral 15 denotes another external connection conductor for mounting the slide contact 14. Therefore, even when the movable contact rod 9 moves up and down (an operating apparatus is not shown), the rod 9 is electrically connected to the external connection conductor 15 via the slide contact 14. The numeral 16 denotes a tubular main shield disposed at the intermediate portion of the envelope for preventing metal vapor, generated from the fixed and movable contacts 10 and 13 when they are opened or closed, from depositing onto the inner surfaces of the tubular insulating housings 2. The numeral 17 denotes a pair of upper and lower auxiliary shields. Further, in FIG. 1, when a high supply voltage is connected to the external conductor 11, a power circuit is connected to the other external conductor 15.

The vacuum interrupter 1 is operated by driving the movable contact 13 up and down to close and open an electric power circuit connected thereto. When the two contacts are closed, current flows from the upper external connection conductor 11 to the lower external connection conductor 15 or vice versa, through the path of the fixed contact rod 8, the fixed contact 10, the movable contact 13 and the movable contact rod 9.

Power circuit interruption is effected by driving the movable contact 13 downward so as to be separated from the fixed contact 10 by an appropriate operating apparatus (not shown).

Figure 2A:
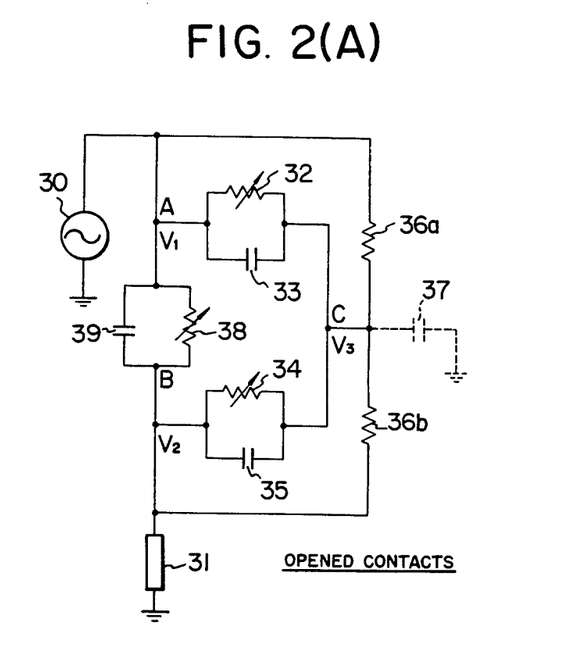
FIG. 2(A) is an equivalent circuit diagram of the vacuum interrupter shown in FIG. 1, in which the two contacts thereof are kept opened.
Figure 2B:
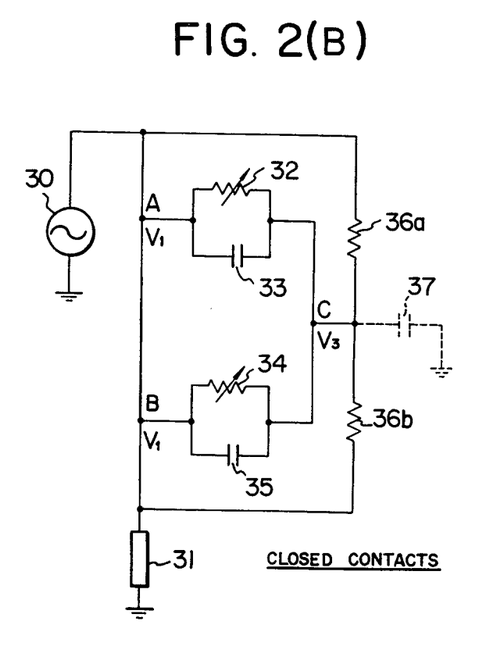
FIG. 2(B) is an equivalent circuit diagram of the vacuum interrupter shown in FIG. 1, in which the two contacts thereof are kept closed.

FIG. 2(A) is an equivalent circuit diagram of the vacuum interrupter shown in FIG. 1, in which the two contacts thereof are kept opened. FIG. 2(B) is the same circuit diagram, in which the two contacts thereof are kept closed. In the figures, the reference numeral 30 denotes a power supply for a power circuit to be interrupted by a vacuum interrupter; the reference numeral 31 denotes a load for the power circuit. The reference numeral 32 denotes an insulation resistance existing between the fixed contact 10 including the fixed contact rod 8 and the main shield 16; the numeral 33 denotes a stray capacitance existing between the fixed contact 10 including the fixed contact rod 8 and the main shield 16. The reference numeral 34 denotes an insulation resistance existing between the movable contact 13 including the movable contact rod 9 and the main shield 16; the numeral 35 denotes a stray capacitance existing between the movable contact 13 including the movable contact rod 9 and the main shield 16. The reference numerals 36a and 36b denote insulation resistances in the two tubular insulating housings 2, respectively; the numeral 37 denotes a stray capacitance existing between the main shield 16 and the ground. Further, in FIG. 2(A), the reference numeral 38 denotes an insulation resistance existing between the fixed and movable contacts 10 and 13, and the numeral 39 denotes a stray capacitance existing between the two contacts 10 and 13, in the case where the two contacts are opened.

As well understood in FIGS. 2(A) and 2(B), only the insulation resistances are represented in the form of variable resistor. The reason is as follows: since the dielectric constant in a vacuum is almost the same as that in the air, the stray capacitances 33, 35, 37, and 39 do not change even when the vacuum pressure within the vacuum interrupter deteriorates, that is, increases. On the other hand, the insulation resistances 32, 34, and 38 change in accordance with a prebreakdown voltage depending upon Paschen's law when the vacuum pressure deteriorates. Generally, Paschen's law indicates that breakdown voltage in a vacuum decreases with increasing products of vacuum pressure (Torr) and contact gap distance (mm) to a certain point of inflection and then increases with the increasing products after exceeding the inflection point.

In the figure, assuming that the potential is $V_1$ at junction point A, the potential is $V_2$ at junction point B, and the potential (floating potential) is $V_3$ at junction point C, the potential differences $(V_1-V_2)$, $(V_1-V_3)$ and $(V_2-V_3)$ between A and B, A and C, and B and C change according to the values of the variable resistors, 38, 32, and 34, respectively; that is, the vacuum pressure within the envelope shown in FIG. 1. In more detail, when the vacuum pressure within the interrupter is normal lying less than $10^{-4}$ Torr, the respective potential differences are constant; however, in case the vacuum pressure becomes poor or increases gradually due to air leakage or outgassing and therefore ions are produced within the envelope, the insulation resistances 32, 34 and 38 decrease, thus resulting in anxious electric dark current flowing mainly between the fixed and movable contacts 10 and 13 when the two contacts are kept opened, and between the fixed and movable contact rods 8 and 9 including the two contacts and the main shield 16 when the two contacts are kept closed.

The insulation resistance 38, 32 or 34 drops gradually over a long time (e.g. 2 to 3years) and therefor anxious electric dark current will flow therebetween, thus a kind of anxious electromagnetic wave being emitted. Since the electromagnetic wave generated by the above-mentioned potential difference (between A and B or between A and C or B and C) tends to be propagated in conductive material connected to the vacuum interrupter, it is possible to indirectly check poor vacuum pressure within a vacuum interrupter by providing a detector terminal inductively or capacitively coupled to a conductive material of the interrupter in order to detect the electromagnetic wave signals generated by anxious electric dark discharge when the vacuum pressure increases within the vacuum interrupter.

Further, in the above description, it is obvious that the potential $V_1$ is equal to the potential $V_2$ when the two contacts are kept closed and the floating potential $V_3$ changes according to the stray capacitance 37 which is usually determined by the grounded condition.

It should be noted that the above-mentioned electric discharge is quite different from so-called partial discharge or corona discharge which is caused by uneven electric field and results in local insulation destruction.

Figure 3A:
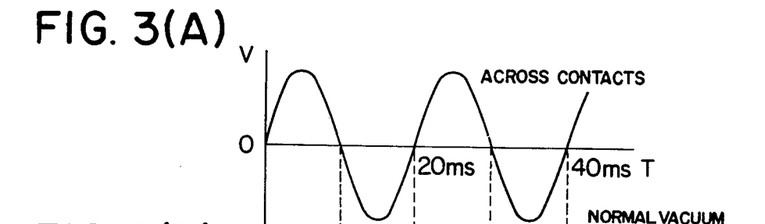
FIG. 3(A) is a graphical representation showing a 50 Hz voltage wave-form developing across the fixed and movable contacts of a vacuum interrupter, when the vacuum pressure within the interrupter is normal.
Figure 3B:
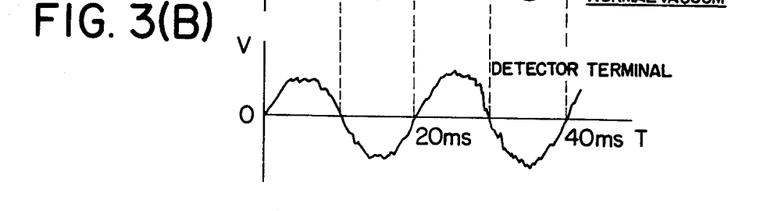
FIG. 3(B) is a graphical representation showing a 50 Hz voltage wave-form received through a detector terminal by the vacuum monitor according to the present invention, when the vacuum pressure within the interrupter is normal.
Figure 4A:
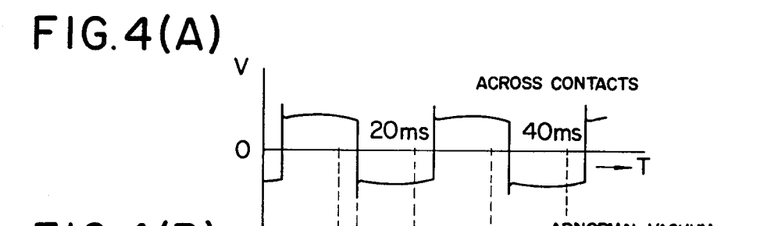
FIG. 4(A) is a graphical representation showing a 50 Hz voltage wave-form developing across the fixed and movable contacts of a vacuum interrupter, when the vacuum pressure within the interrupter is abnormal.
Figure 4B:
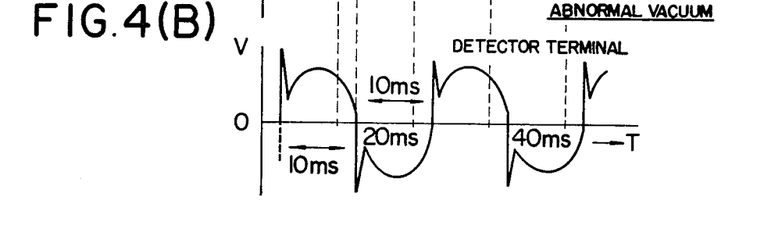
FIG. 4(B) is a graphical representation showing a 50 Hz voltage wave-form received through a detector terminal by the vacuum monitor according to the present invention, when the vacuum pressure within the interrupter is abnormal.

Now, follows a description of the wave-forms of the electromagnetic wave signals received through a detector terminal by the vacuum monitor according to the present invention, with reference to FIGS. 3 and 4.

FIG. 3(A) shows the wave-form of the voltage signal developing across the two contacts when the vacuum pressure within the vacuum interrupter is normal (e.g. $10^{-4}$ Torr or less). FIG. 3(B) shows the wave-form of the signal received through a detector terminal when the vacuum pressure is normal. These figures indicate that under normal vacuum pressure the voltage wave-form across the two contacts is a sine wave of a commercial frequency (e.g. 50 or 60 Hz) and the signal received through the detector terminal is roughly a sine wave upon which signals including higher harmonics of 2 kHz or less or 400 kHz or more are superimposed. These superimposed signals of 2 kHz or less frequencies may be generated for rotary machines, transformers, measuring devices, etc. installed near the vacuum interrupter or in or near the electric power circuit to which the vacuum interrupter is connected. On the other hand, these superimposed signals of 400 kHz or more frequencies are generated due to partial discharge. As described later, since a band-pass filter is provided for the vacuum monitor, these signals with frequencies of 2 kHz or less or of 400 kHz or more can be eliminated. Further, by connecting a certain capacitor to the input terminal of the buffer amplifier provided for the vacuum monitor, commercial frequency components of 50 or 60 Hz can easily be eliminated. That is to say, when the vacuum pressure within the vacuum interrupter is normal, the vacuum monitor outputs no signal.

On the other hand, FIG. 4(A) shows the wave-form of the voltage signal developing across the two contacts when the vacuum pressure is abnormal (e.g. $10^{-3}$ Torr or more). FIG. 4(B) shows the wave-form of the electromagnetic wave signals received through the detector terminal when the vacuum pressure is abnormal. These FIGURES indicate that under abnormal vacuum pressure the voltage wave-form across the two contacts is roughly a square wave, the phase thereof being a little delayed from the sine wave, and the voltage wave-form of the electromagnetic wave signal received through the detector terminal is of a peculiar FIGURE in which ripples including relatively-high frequency components of 2 kHz or more are superimposed upon a sine wave or an alternating voltage signal.

This is because once electric discharge begins within the vacuum interrupter, the voltage across the contacts cannot rise up to the peak value as shown in FIG. 4(A) being clipped at a certain voltage level. Further, whenever the voltage across the contacts rises sharply, the ripple is generated. The reason why the signal of such a wave-form as described above is received through the detector terminal when electric discharge begins under abnormal vacuum pressure has not yet perfectly been analyzed. However, it is true that the signal as described above can be received through the detector terminal whenever the vacuum pressure within the vacuum interrupter increases abnormally, and the frequency components of the electromagnetic wave signal lie between 2 and 400 kHz, which is higher than those generated from machines or devices other than the vacuum interrupter but lower than those generated due to partial discharge. Additionally, experiments indicate that the signal levels of frequency components from 2 to 20 kHz are fairly high as compared with those of frequency components higher than 20 kHz.

Therefore, by detecting the electromagnetic wave ripple signals superimposed on the sine wave, it is possible to check the generation of electric discharge within the interrupter due to poor vacuum pressure. Furthermore, even if partial discharge is generated from other devices, since the wave-form thereof is quite different from that of the electromagnetic wave signal generated by the dark current discharge and the frequency components of partial discharges are generally higher than that of the electromagnetic wave signal, there will exist no harmful influence upon the detection characteristics of the vacuum monitor.

There will be described hereinbelow the experimental results of the vacuum interrupter and the vacuum monitor according to the present invention.

In the case where the vacuum pressure within a vacuum interrupter is detected through an antenna under relatively undesired condition while changing the vacuum pressure within the range of $5 \times 10^{-3}$ to 300 Torr, the frequency components of the electromagnetic wave signals received through the antenna ranges from 10 to 14 kHz when the electrostatic capacitance between the load and the ground is 0.0042 $\mu$F, from 2 to 8 kHz when the capacitance is 0.05 $\mu$F, and from 2 to 20 kHz when the capacitance is 0.2 $\mu$F or more. Further, when the capacitance is as small as 0.0042 $\mu$F or less, since experiment has indicated that the detection sensitivity becomes unstable, the detection sensitivity can be improved by connecting a capacitance of about 0.2 $\mu$F on the load side of the vacuum interrupter, in order to stably detect the electromagnetic wave signals caused by abnormal poor vacuum pressure.

Further, in the case where the vacuum pressure of which is approximately $10^{-1}$ Torr, and a voltage of $6.9/\sqrt{3} \approx 4$ kV is applied to the interrupter with a capacitor of 0.2 $\mu$F connected between the load-side conductor and the ground, when the two contacts are kept opened, the detected signal voltage outputted from the vacuum monitor is about 0.6V if the gain thereof is 10,000.

Further, under almost the same experiment conditions, when the two contacts are kept closed, the detected signal voltage outputted from the vacuum monitor is about 0.3V.

The reason why the detected signal voltage is low when the two contacts are closed, in comparison with that obtained when the two contacts are opened, may be due to the following fact: when the two contacts are closed, since electric discharge is generated only between the fixed and movable contact rods 8 and 9 including the fixed and movable contacts 10 and 13 and the main shield 16, the insulation resistance (parallel connection of 32 and 34) existing therebetween may be greater than the insulation resistance 38 existing between two contacts, and therefore the electric discharge energy obtained when the two contacts are closed may be smaller than that obtained when the two contacts are opened. Further, in the case when poor vacuum pressure is detected through the detector terminal according to the present invention, a fairly high-level voltage signal indicative of poor vacuum can be obtained, even if the gain of the monitor is relatively low.

Figure 5A:
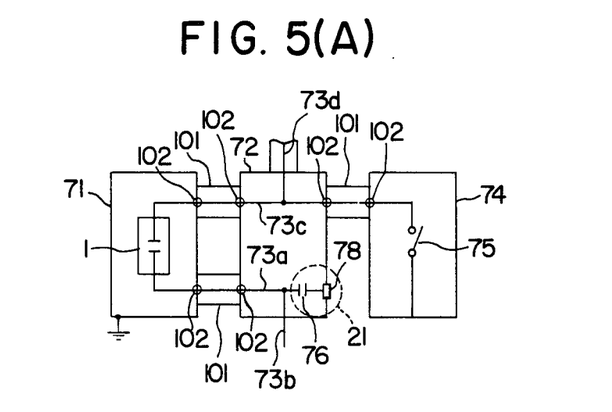
FIG. 5(A) is a diagrammatical illustration of a vacuum interrupter disposed within a miniature substation installation, and a detector terminal of a first embodiment of capacitor coupler type.

FIG. 5(A) shows an exemplary miniature substation installation, in which the three-phase bus bars or conductors are illustrated by a single line. In the drawing, the reference numeral 71 denotes a first tank within which a vacuum interrupter is housed; the numeral 72 denotes a second tank connected to the first tank 71 through ducts 101, within which conductors 73a connected to the power-supply cables 73b and conductors 73c connected to the load cable 73d are housed respectively; the numeral 74 denotes a third tank connected to the second tank 72 through a duct 101, within which a disconnecting switch 75 is housed. The tanks 71, 72 and 74 and the ducts 101 are all made of a metal and are grounded. All the tanks and the ducts are filled with an insulating medium and the ducts 101 are airtightly sealed to the tanks through insulating spacers 102.

Figure 5B:
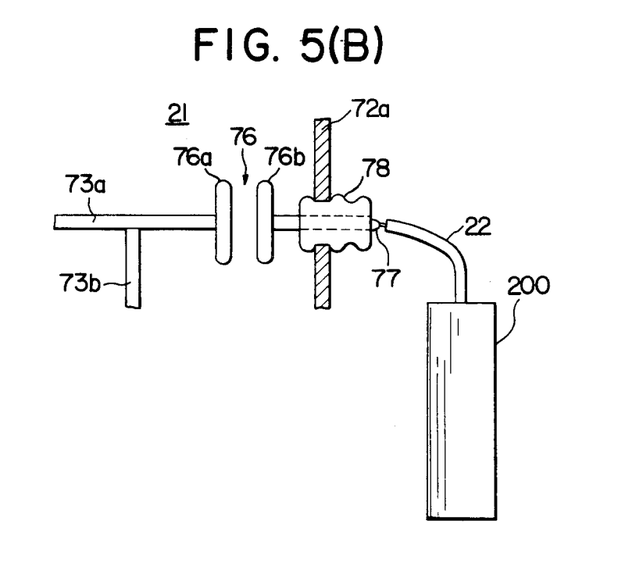
FIG. 5(B) is an enlarged illustration showing only the detector terminal of the first embodiment of capacitor coupler type shown in FIG. 5(A)

In the second tank 72, a detector terminal 21 of capacitor coupler type is connected to the power supply conductor 73a, as more clearly depicted in the enlarged drawing of FIG. 5(B) shown below. The detector terminal 21 comprises a capacitor 76 one electrode 76a of which is connected to the power supply conductor 73a and the other electrode 76b of which is connected a detection conductor 77. The detection conductor 77 is guided to the outside of the second tank 72 through an insulator 78 fixed to the wall 72a of the second tank 72. A detecting cable 22 led out of the vacuum monitor 200 is brought into contact with one outer end portion of the detection conductor 77 for sensing the electromagnetic wave signals indicative of a poor vacuum. In this case, it is preferable to use a pair of male and female plugs for connection between the insulator 78 and the detecting cable 22. In more detail, a male plug is attached to one end of the detecting cable 22 and a female plug is implanted within the insulator 78, for instance. Further, in order to reduce the influence of external noise, it is further preferable to use a coaxial cable as the detecting cable 22 with the outer shield wire net connected to the ground, instead of a single insulated cable.

Figure 6:
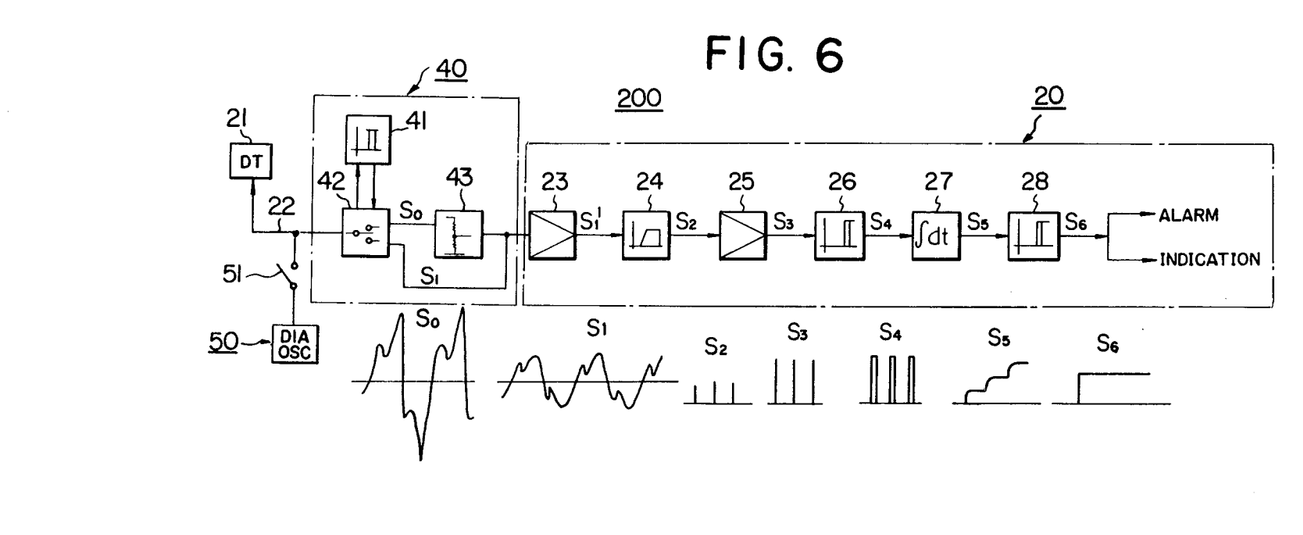
FIG. 6 is a schematic block diagram of the vacuum monitor for a vacuum interrupter according to the present invention.

FIG. 6 shows a schematic block diagram of the vacuum monitor 200 according to the present invention. The vacuum monitor 200 is roughly made up of a detection terminal section, a signal level discriminating section 40, a diagnosis section 50 and a detection section 20. The detection terminal section includes a detector terminal 21 such as capacitor coupler type and a detecting cable 22.

Figure 7:
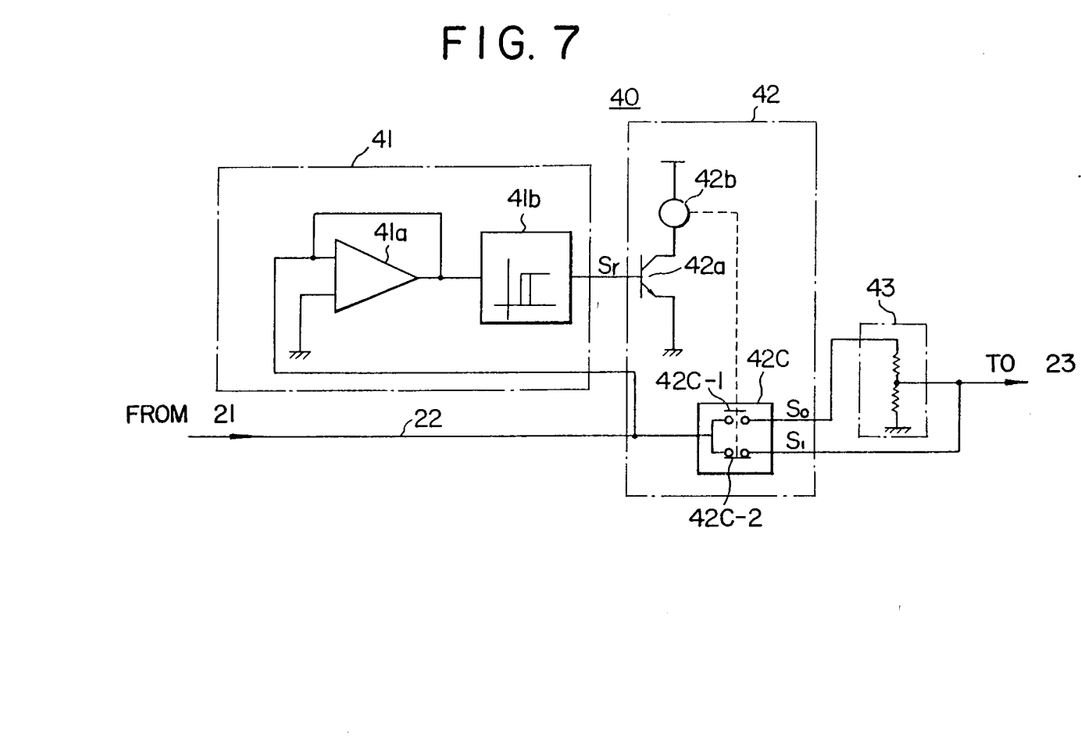
FIG. 7 is a more detailed schematic block diagram of a signal level discriminating section incorporated in the vacuum monitor for a vacuum interrupter according to the present invention shown in FIG. 6.

The signal level discriminating section 40 includes a comparator section 41 having an amplifier 41a and a first comparator 41b, a switching section 42 having a transistor 42a , a relay 42b and relay contacts 42c, and a voltage divider section 43, as shown in more detail in FIG. 7. The diagnosis section 50 includes a CR time constant circuit 50a, a CR oscillator 50b and an amplifier 50c, as shown in more detail in FIG. 8. The detection section 20 includes a buffer amplifier 23, a band-pass filter 24, an amplifier 25, a first comparator 26, and integrator or a counter 27 and a second comparator 28.

The detection terminal section detects impulsive electromagnetic wave signals through the detector terminal 21 indirectly coupled to a conductive material of a vacuum interrupter when the vacuum pressure within the vacuum interrupter is abnormal. The detector terminal 21 is of a capacitor coupler type as shown in FIGS. 5(A) and 5(B). The detecting cable 22 is a single or coaxial cable brought into contact with the detector terminal 21 directly.

The signal level discriminating section 40 serves to discriminate the magnitude of the voltage level of the electromagnetic wave signals and to output the signals to the next stage directly, when the magnitude of the voltage level is relatively small; but indirectly, after having reduced the voltage level thereof into a smaller level through the voltage divider 43, when the magnitude of the voltage level is relatively great.

With reference to FIG. 7, the amplifier 41a is a high-input impedance operational amplifier, the input terminal of which is connected to the detector terminal 21 through the detecting cable 22 and the output terminal of which is connected the comparator 41a. The comparator 41b discriminates the magnitude of the voltage level of the electromagnetic wave signals sensed through the detector terminal 21 and outputs a voltage level reduction signal $S_r$ to the base of the switching transistor 42a only when the magnitude of the signal voltage level exceeds a predetermined reference voltage level. In response to this signal $S_r$ from the comparator 41b, the switching transistor 42a is turned on to energize a relay 42b connected to the collector terminal of the transistor 42a. When the relay 42b is energized, the relay contact 42c is changed over. The relay contact 42c includes a first contact 42C-1 connected to the next stage through the voltage divider 43 and a second contact 42C-2 connected directly to the next stage. In the usual state, the first contact 42C-1 is kept opened and the second contact 42C-2 is kept closed. Therefore, when the magnitude of the electromagnetic wave signal voltage level is small, the low-level electromagnetic wave signal $S_1$ is directly applied to the next stage without reduction of the voltage level. However, when the magnitude of the electromagnetic wave signal voltage level exceeds a predetermined reference voltage level, since the comparator 41b outputs the voltage level reduction signal $S_r$, the transistor 42a is turned on; the relay 42b is energized; the relay contact 42c is changed over, so that the first contact 42C-1 is closed. Therefore, the high-level electromagnetic wave signals $S_o$ are applied to the next stage through the voltage divider 43 by which the voltage level thereof is reduced. Accordingly, in case the magnitude of the voltage level of the sensed signals $S_o$ is extraordinarily great and some external electrical noise signals are mixed with the sensed signals $S_o$, it is possible to reliably detect the sensed impulsive electromagnetic wave signals indicative of a poor vacuum at a relatively constant signal voltage level without being subject to the influence of external electrical noise signals.

The detection section 20 serves to generate an alarm sound or to activate an alarm indicator when the magnitude of the voltage level of the electromagnetic wave signals exceeds an allowable reference voltage level beyond the predetermined reference number of times.

With reference to FIG. 6, the buffer amplifier 23 having an high input impedance amplifies the signal received through the signal level discriminating section 40 and outputs the signal $S_1'$. The signal $S_1'$ indicates that the impulsive electromagnetic wave signals are superimposed as ripples upon a commercial frequency of, for instance, 50 or 60 Hz. The band-pass filter 24 passes only the frequency components of 2 to 400 kHz exactly (2 to 20 kHz substantially) from the signal $S_1$40 (the commercial frequency components are, of course eliminated) and outputs signal $S_2$. That is to say, this band-pass filter 24 serves to eliminate frequency components of 2 kHz or less and 400 kHz or more exactly (20 kHz or more substantially) from the signal $S_1$. This is because rotary machines, transformers, power measurement instruments, etc. often generate signals including higher harmonics of 2 kHz or less and partial discharge generates signals including higher harmonics of 400 kHz or more. The amplifier 25 amplifies the filtered signal $S_2$ to the corresponding signal $S_3$. The first comparator 26 compares this amplified signal $S_3$ with a predetermined reference voltage level and outputs a signal $S_4$ whenever the amplified signal $S_3$ exceeds the reference level. The integrator (or a counter) 27 continually integrates or counts the number of the signal $S_4$ and outputs the corresponding signal $S_5$. The second comparator 28 compares the integrated or counted signal $S_5$ with another predetermined reference value and outputs a signal $S_6$ when the signal $S_5$ exceeds the reference level. This signal $S_6$ outputted from the second comparator 28 is used for producing an alarm or for activating an indicator to show poor vacuum pressure or that vacuum pressure is abnormally increasing within the interrupter.

Figure 8:
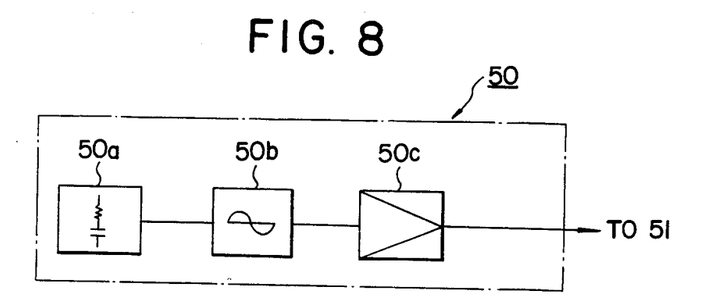
FIG. 8 is a more detailed schematic block diagram of a diagnosis section in corporated in the vacuum monitor for a vacuum interrupter according to the present invention shown in FIG. 6.

The diagnosis section 50 serves to diagnose the functions of the vacuum monitor before and after checking a poor vacuum pressure within the vacuum interrupter. In other words, the diagnosis section 50 checks whether or not the detecting section 20 operates normally. For the above-mentioned purpose, this diagnosis section 50 outputs any one of a first diagnosis signal the frequency of which is from about 2 kHz (the lower limit value of the filter 24) to about 400 kHz exactly or 20 kHz substantially (the upper limit value of the filter 24), a second diagnosis signal the frequency of which is less than 2 kHz and a third diagnosis signal the frequency of which is more than 400 kHz (20 kHz substantially).

To diagnose the detection section 20, first the diagnosis switch 51 is turned on manually and then the first diagnosis signal of from 2 kHz to 400 kHz (2 kHz to 20 kHz substantially) is applied to the signal level discriminating section 40. In this case, if an alarm sound or an alarm indication is produced, the detection section 20 is determined to be normal. On the other hand, if no alarm sound or no alarm indication is produced, the detection section 20 is determined to be abnormal. In contrast with this, if an alarm sound or alarm indication is produced when the second diagnosis signal (2 kHz or less) or the third diagnosis signal (400 kHz or more or 20 kHz or more) is applied to the signal level discriminating section 40, the detection section 20 is determined to be abnormal. If no alarm sound or no alarm indication is produced when the second or third diagnosis signals is applied to the detection section 20, the detection section 20 is determined to be normal. By applying the above-mentioned diagnosis signals to the detection section 20, it is possible to check the normal operations of the amplifiers 23 and 25, the filters 24, the first and second comparators 26 and 28, the integrator or counter 27, and the alarm or indicator device together at the same time.

As shown in FIG. 8, the diagnosis section 50 is made up of a CR time constant circuit 50a, a CR oscillator 50b and an amplifier 50c. The CR time constant circuit 50a includes a Schmitt circuit, for instance, and a CR circuit having a variable resistor. Therefore, by adjusting the resistance of the CR time constant circuit, it is possible to selectively obtain a first CR time constant corresponding to the first diagnosis signal (between 2 and 400 kHz or 20 kHz), a second CR time constant corresponding to the second diagnosis signal (2 kHz or less) or a third CR time constant corresponding to the third diagnosis signal (400 kHz or more, or 20 kHz or more). In accordance with these adjusted values, the CR oscillator 50b can generate any one of the first, second and third diagnosis signals. These diagnosis signals are applied to the voltage level discriminating section 40 after amplification by an amplifier 50c, instead of the electromagnetic wave signals sensed through the detector terminal 21, in order to check the normal operation of the detecting section 20.

In the first embodiment of the vacuum monitor according to the present invention shown in FIGS. 5(A) and 5(B), the detector terminal of capacitor coupler type is additionally and separately provided in the wall of the tank. However, it is also possible to utilize the elements already provided for the vacuum interrupter for the detector terminal. In more detail, since the vacuum interrupter is usually provided with various measuring instruments in order to measure the voltage applied to the interrupter and the current passing through the interrupter (e.g. a voltage detector or capacitor, current transformer, potential transformer, etc.), it is also possible to detect the impulsive electromagnetic wave signals more easily through the output terminals of these already-housed measuring instruments. In other words, the detector terminal is not necessarily disposed additionally for the vacuum interrupter.

Figure 9A:
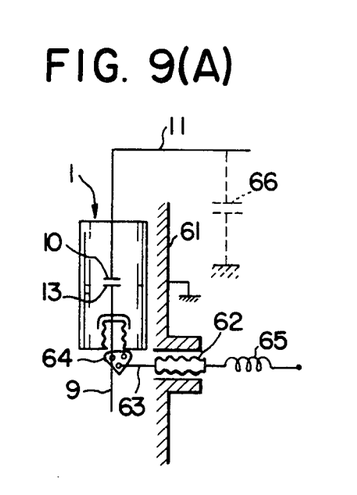
FIG. 9(A) is a diagrammatical illustration showing a vacuum interrupter the evacuated envelope of which is covered by an insulating solid material (the outer surface of which is formed with a metal layer connected to the ground) and a detector terminal of a second embodiment of capacitor coupler type.

FIG. 9(A) shows a second embodiment of the detector terminal of capacitor coupler type used for the vacuum monitor according to the present invention.

In FIG. 9(A), the vacuum interrupter 1 is molded by a resin casing 61 made of an insulating material such as epoxide resin. The metal layer formed on the outer surface of the casing 61 is perfectly grounded. The reference numeral 62 denotes an insulated operation rod; the reference numeral 63 denotes an operation conductor, one end of which is connected to the movable conductive contact rod 9 via an operation lever 64. Further, the reference numeral 65 denotes an operation spring, one end of which is implanted within the insulated operation rod 62. Therefore, when the operation spring 65 is energized or deenergized by the aid of an operation device (not shown), the movable conductive contact rod 9 is moved in either direction via the operation lever 64 to open or close the movable contact 13 with respect to the fixed contact 10.

Figure 9B:
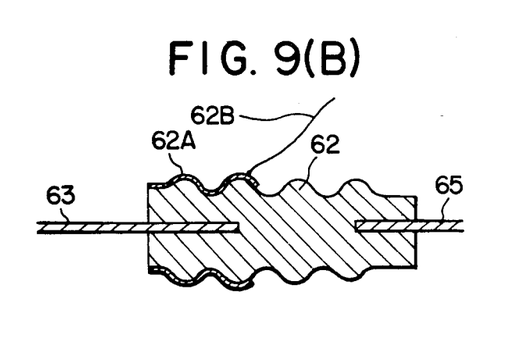
FIG. 9(B) is an enlarged illustration showing only the detector terminal of the second embodiment of capacitor coupler type shown in FIG. 9(A)

In this second embodiment as more clearly depicted in FIG. 9(B), the detector terminal of capacitor coupler type is made up of one end of the operation conductor 63 implanted at the center of the insulated operation rod 62 and a metal semicircular ring 62A formed on the outer surface of the operation rod 62. Therefore, the end of the operation conductor 63 serves as one electrode and the semicircular ring 62A serves as the other electrode of a capacitor. This semicircular ring 62A is connected to the switching section 42 of the voltage level discriminating section 40 through a capacitor cable 62B and the detecting cable 22.

Further in FIG. 9(A), the reference numeral 66 denotes a capacitor connected to the external connection conductor 11 on the load side in order to increase the detection sensitivity of the vacuum monitor to the electromagnetic wave signals.

Figure 10:
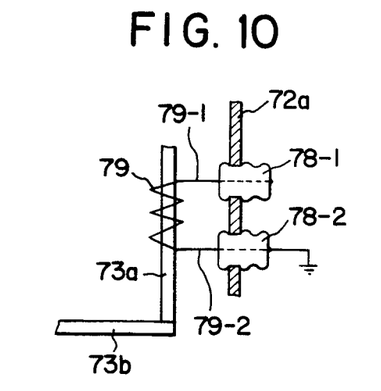
FIG. 10 is a diagrammatical illustration showing a detector terminal of current transformer type.

FIG. 10 shows a detector terminal of current transformer type, which is provided for the miniature substation installation shown in FIG. 5(A). The current transformer is a kind of transformer used for insulating the secondary winding 79 from the primary winding (power supply conductor 73a) and for mainly transforming the current passing through the conductor 73a. Further, the reference numerals 78-1 and 78-2 denote insulators fixed to the wall 72a of the second tank 72 of the miniature substation installation. For safety, either one of these two secondary winding terminals 79-1 and 79-2 is grounded. The detecting cable 22 of the vacuum monitor 200 is brought into contact with the secondary winding terminal 79-1 for sensing the impulsive electromagnetic wave signals indicative of a poor vacuum.

Figure 11:
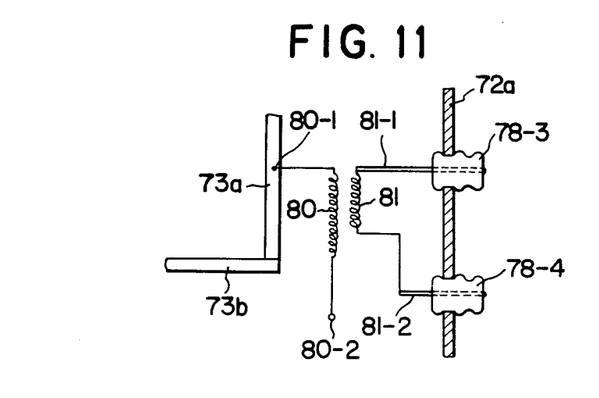
FIG. 11 is a diagrammatical illustration showing a detector terminal of potential transformer type.

FIG. 11 shows a detector terminal of potential transformer type, which is provided for the miniature substation installation shown in FIG. 5(A). The potential transformer is a kind of transformer also used for insulating the secondary winding 81 from the primary winding 80, one end (80-1) of which is connected to one-phase power supply conductor 73a and the other end (80-2) of which is connected to the other-phase power supply conductor. The potential transformer serves to mainly transform the potential developed across the primary winding 80. Further, the reference numerals 78-3 and 78-4 denote two insulators fixed in the wall 72a of the second tank 72, respectively. The reference numerals 81-1 and 81-2 denote secondary winding terminals, respectively. Similarly, the detecting cable 22 of the vacuum monitor 200 is brought into contact with the secondary winding terminals 81-1 and 81-2 for sensing the impulsive electromagnetic wave signals indicative of a poor vacuum.

The above-mentioned two detector terminals of current transformer type and potential transformer type are of inductor coupler type, in comparison with the detector terminals shown in FIGS. 5(B) and 9(B).

Conventionally, complicated steps have been required for checking the vacuum pressure within a vacuum interrupter housed within a tank filled with an insulating oil or gas as follows: First, the insulating oil or gas is removed from the tank; secondly, the contact gap between the fixed and the movable contacts is so adjusted as to become an appropriate spacing suitable for dielectric strength test in accordance with Paschen's law; thirdly, a high voltage is applied to the contact gap in accordance with a method of voltage-withstand test, fourthly, the contact gap of the checked vacuum interrupter is returned to its original spacing; lastly, the interrupter is placed within a tank and an insulating oil or gas is filled therewithin. Accordingly, it takes much time and labor to check the vacuum pressure and additionally there inevitably exists a difference in contact gap spacing between before and after the vacuum pressure is checked; that is, it is very difficult to return the contacts to the original gap condition. In this invention, however, since there are no needs of such complicated test procedures as described above and of providing any additional parts or elements or a separate high-voltage power supply, it is possible to check the deterioration of vacuum pressure easily and accurately at a low cost, by efficiently utilizing various measuring instruments such as voltage detector, current transformer, potential transformer, etc. which are all previously housed within the conventional vacuum interrupter.

The vacuum monitor according to the present invention is applicable to almost all the ordinary vacuum interrupters now in use, and advantageously can check the vacuum pressure while a voltage is kept applied to the interrupter, that is, under hot-line condition.

Further, since a commercial domestic power supply (100 or 200 V) or battery cells can be used as the power supply for the monitor, it is possible to realize a small-sized light-weight portable-type vacuum monitor. Furthermore, in accordance with Paschen's law, since the breakdown voltage V decreases with increasing product of vacuum pressure P and contact gap distance d until the product reaches the Paschen's minimum breakdown voltage but increases with increasing product of vacuum pressure and gap distance when the product exceeds the minimum breakdown voltage, even if vacuum pressure is constant, when the contact distance d increases up to the minimum breakdown voltage, the breakdown voltage decreases with increasing contact gap distance. In other words, the more the contact spacing, the higher the detection sensitivity of the monitor. Therefore, even if the contacts are kept closed, the breakdown voltage is easily generated between the shield and contact rods. The electric dark discharge is generated at a lower voltage in dependence upon Paschen's law. Therefore, it is possible to check vacuum pressure within such a range as wide as $10^{-3}$ to 100 Torr.

As described above, in the vacuum monitor according to the present invention, since the vacuum pressure within a vacuum interrupter can be checked, on the basis of the impulsive electromagnetic wave signals generated by electric discharge existing between the two contacts in the case when the two contacts are kept opened or between the two contact rods including the contacts and the main shield in the case when the two contacts are kept closed in accordance with a prebreakdown voltage depending upon Paschen's law, by the use of a detector terminal capacitively or inductively coupled to the conductive material of the interrupter and since the sensed signals including higher harmonics of 2 to 400 kHz exactly or of 2 to 20 kHz substantially are amplified and compared with a predetermined reference value to output an alarm signal, it is possible to realize a very convenient, low-priced, small-sized vacuum monitor for a vacuum interrupter housed within a tank or housing which is perfectly shielded and grounded.

Further, since the signal level discriminating section is incorporated in the vacuum monitor according to the present invention for discriminating the magnitude of the voltage level of the electromagnetic wave signals indicative of a poor vacuum and for selectively supplying the signals to the detection section through the voltage divider when the voltage level of the electromagnetic wave signals exceeds a predetermined reference voltage level, it is possible to reliably process the sensed electromagnetic wave signals indicative of a poor vacuum at the relatively constant voltage level without being subject to the influence of external electrical noise signals.

Furthermore, since the diagnosis section is additionally provided in the vacuum monitor according to the present invention for outputting any desired diagnosis signals with frequencies of 2 kHz to 400 kHz exactly or of 2 to 20 kHz substantially or with frequencies lower than 2 kHz and higher than 400 kHz exactly or 20 kHz substantially in order to diagnose the functions of the vacuum monitor, before and after checking the poor vacuum pressure within the vacuum interrupter, it is possible to more reliably detect the electromagnetic wave signals indicative of a poor vacuum.

Further, in the case where a low-gain amplifier is incorporated within the monitor, it is possible to sufficiently diagnose the monitor according to the present invention by inputting diagnosis signals with frequencies of 2 kHz to 20 kHz or with frequencies lower than 2 kHz and higher than 20 kHz to the monitor. This is because the signal levels of frequency components from 2 to 20 kHz are fairly high as compared with those of frequency components higher than 20 kHz.

It will be understood by those skilled in the art that the foregoing description is in terms of a preferred embodiment of the present invention wherein various changes and modifications may be made without departing from the spirit and scope of the invention, as set forth in the appended claims.

What is claimed is:

1. A vacuum monitor for a vacuum interrupter provided with high-voltage conductors connected to the interrupter, said vacuum monitor comprising:
   (a) detector terminal means disposed near the high voltage conductors and non-galvanically coupled to the high voltage conductors for receiving impulsive electromagnetic wave signals superimposed upon an alternating voltage, said impulsive signals being generated by electric discharge caused when vacuum pressure increases within the vacuum interrupter; and
   (b) detecting means connected to said detector terminal means for electrically processing the impulsive electromagnetic wave signals received through said detector terminal means and for outputting an alarm signal, indicative of abnormal vacuum pressure within the vacuum interrupter, when the voltage level of the processed impulsive electromagnetic wave signal exceeds a predetermined reference value.

2. A vacuum monitor for a vacuum interrupter as set forth in claim 1, wherein said detector terminal means is of a capacitor coupler type.

3. A vacuum monitor for a vacuum interrupter as set forth in claim 1, wherein said detector terminal means is of a current transformer type.

4. A vacuum monitor for a vacuum interrupter as set forth in claim 1, wherein said detector terminal means is of a potential transformer type.

5. A vacuum monitor for a vacuum interrupter as set forth in claim 2, wherein said detector terminal means of a capacitor coupler type is attached to a grounded metal housing of the vacuum interrupter.

6. A vacuum monitor for a vacuum interrupter as set forth in claim 5, wherein said detector terminal means of a capacitor coupler type comprises:
   (a) a first electrode connected to a high voltage conductor;
   (b) a second electrode disposed near said first electrode so as to produce an electrostatic capacity in cooperation with said first electrode; and
   (c) a detection conductor connected to said second electrode and taken out of the grounded metal housing within which the vacuum interrupter is housed through an insulator, a detecting cable connected to said detecting means of the vacuum monitor being brought into contact with said detection conductor for detecting the impulsive electromagnetic wave signals indicative of a poor vacuum.

7. A vacuum monitor for a vacuum interrupter as set forth in claim 5, wherein said detector terminal means of a capacitor coupler type comprises:
   (a) an operation conductor connected to an operation lever provided for the vacuum interrupter, one end of said operation conductor being implanted within an insulated operation rod provided for the grounded metal housing, one end of said operation conductor being used as a first electrode;
   (b) a semicircular ring formed around an outer surface of the insulated operation rod and near said operation conductor, said ring being used as a second electrode; and
   (c) a capacitor cable connected to said second electrode and taken out of the grounded metal housing within which the vacuum interrupter is housed, a detecting cable connected to said detecting means of the vacuum monitor being brought into contact with said capacitor cable for detecting the impulsive electromagnetic wave signals indicative of a poor vacuum.

8. A vacuum monitor for a vacuum interrupter as set forth in claim 1 wherein said detecting means comprises:
   (a) band-pass filter means responsive to said detector terminal means for passing only signals with frequency components from 2 kHz to 400 kHz;
   (b) first comparator means responsive to said band-pass filter means for comparing voltage level of the filtered electromagnetic wave signals with a predetermined reference voltage level and outputting signals when the voltage level of the filtered electromagnetic wave signals exceeds the reference level;
   (c) counter means responsive to said first comparator means for counting a number of the electromagnetic wave signals exceeding the reference level; and
   (d) second comparator means responsive to said counter means for comparing the number counted by said counter means with a predetermined reference number and outputting a signal when the counted number exceeds the reference number to indicate that the vacuum pressure within the vacuum interrupter is above the predetermined level.

9. A vacuum monitor for a vacuum interrupter as set forth in claim 1, which further comprises signal level discriminating means responsive to said detector terminal means for discriminating the voltage level of the impulsive electromagnetic wave signals in order to reduce the signal level only when the signal voltage level exceeds a predetermined reference voltage level, whereby it is possible to reliably detect the impulsive electromagnetic wave signals indicative of a poor vacuum at roughly a constant signal level without being subject to influence of external electrical noise signals.

10. A vacuum monitor for a vacuum interrupter as set forth in claim 9, wherein said signal level discriminating means comprises:
   (a) third comparator means responsive to said detector terminal means for comparing the voltage level of the impulsive electromagnetic wave signals received through said detector terminal means with a predetermined reference voltage level and for outputting a voltage level reduction signal when the voltage level of the received impulsive electromagnetic wave signals exceeds the predetermined reference voltage level;
   (b) voltage dividing means for reducing the voltage level; and (c) switching means responsive to said third comparator means and said detector terminals means for applying the impulsive electromagnetic wave signals received by said terminal means to said detecting means through said voltage dividing means in response to the voltage level reduction signal from said third comparator means and for applying the impulsive electromagnetic wave signals received by said terminal means to said detecting means directly in response to no voltage level reduction signal.

11. A vacuum monitor for a vacuum interrupter as set forth in claim 1, which further comprises diagnosis means selectively connected to said detecting means for outputting diagnosis signals, frequencies of said diagnosis signals corresponding to frequency components of the impulsive electromagnetic wave signals indicative of a poor vacuum, in order to check whether said detecting means operates normally or not, whereby it is possible to diagnose functioning of the vacuum monitor before or after checking the poor vacuum pressure within the vacuum interrupter.

12. A vacuum monitor for a vacuum interrupter as set forth in claim 11, wherein the frequency of said diagnosis signal is lower than 2 kHz, said detecting means being determined to be normal when said detecting means does not output an alarm signal in response to a diagnosis signal with a frequency lower than 2 kHz.

13. A vacuum monitor for a vacuum interrupter as set forth in claim 11, wherein the frequency of said diagnosis signal is higher than 2 kHz, said detecting means being determined to be normal when said detecting means outputs an alarm signal in response to the diagnosis signal with a frequency higher than 2 kHz.

14. In a vacuum monitor for a vacuum interrupter, the interrupter including high-voltage conductors connected to the interrupter, said vacuum monitor comprising detecting means for indicating when a vacuum pressure within the vacuum interrupter is above a predetermined level, the improvement wherein the monitor comprises detector terminal means capacitively coupled to one of the high-voltage conductors of the vacuum interrupter, said detector terminal means receiving, when an alternating voltage of a commercial frequency is applied to the vacuum interrupter, impulsive electromagnetic wave signals superimposed upon the alternating voltage and wherein said detecting means is connected to said detector terminal means for electrically processing the impulsive electromagnetic wave signals received through said detector terminal means and outputs an alarm signal indicative that a voltage level of the impulsive electromagnetic wave signals is above a predetermined level.

15. In a vacuum monitor for a vacuum interrupter, the interrupter including high-voltage conductors connected to the interrupter, said vacuum monitor comprising detecting means for indicating when a vacuum pressure within the vacuum interrupter is above a predetermined level, the improvement wherein the monitor comprises detector terminal means inductively coupled to one of the high-voltage conductors of the vacuum interrupter, said detector terminal means receiving, when an alternating voltage of a commercial frequency is applied to the vacuum interrupter, impulsive electromagnetic wave signals superimposed upon the alternating voltage and wherein said detecting means is connected to said detector terminal means for electrically processing the impulsive electromagnetic wave signals received through said detector terminal means and outputs an alarm signal indicative that a voltage level of the impulsive electromagnetic signals is above a predetermined level.

16. A vacuum monitor for a vacuum interrupter as recited in claim 1 wherein said detector terminal means is inductively coupled to the high voltage conductors.

17. A vacuum monitor for a vacuum interrupter as recited in claim 1 wherein said detector terminal means is capacitively coupled to the high voltage conductors.

* * * * *